(12) United States Patent
Kim et al.

(10) Patent No.: US 8,945,776 B2
(45) Date of Patent: Feb. 3, 2015

(54) ELECTROLYTE FOR RECHARGEABLE LITHIUM BATTERY AND RECHARGEABLE LITHIUM BATTERY INCLUDING THE SAME

(75) Inventors: Tae-Ahn Kim, Suwon-si (KR); Mi-Hyeun Oh, Suwon-si (KR); Na-Rae Won, Suwon-si (KR); Sung-Hoon Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 743 days.

(21) Appl. No.: 12/654,640

(22) Filed: Dec. 28, 2009

(65) Prior Publication Data

US 2010/0183926 A1      Jul. 22, 2010

(30) Foreign Application Priority Data

Jan. 22, 2009   (KR) .................. 10-2009-0005705

(51) Int. Cl.
*H01M 6/18* (2006.01)
*H01M 10/0567* (2010.01)
*H01M 10/0525* (2010.01)

(52) U.S. Cl.
CPC ...... *H01M 10/0567* (2013.01); *H01M 10/0525* (2013.01); *H01M 2300/0025* (2013.01); *Y02E 60/122* (2013.01)
USPC ........... 429/307; 429/200; 429/199; 429/330; 429/332; 429/306; 429/327; 429/329; 252/62.2

(58) Field of Classification Search
CPC .......... H01M 10/052; H01M 10/0567; H01M 10/0568; H01M 10/0569; H01M 2300/0028; H01M 2300/0037; H01M 10/0525; H01M 2300/025; Y02E 60/122
USPC ......... 429/200, 199, 330, 332, 306, 307, 327, 429/329; 252/62.2
See application file for complete search history.

(56) References Cited

U.S. PATENT DOCUMENTS

| | | |
|---|---|---|
| 6,942,948 B2 | 9/2005 | Takehara et al. |
| 7,297,447 B2 | 11/2007 | Kawai et al. |
| 2002/0015895 A1 | 2/2002 | Ueda et al. |
| 2005/0053843 A1 | 3/2005 | Takahashi |
| 2006/0115739 A1 | 6/2006 | Yamaguchi et al. |
| 2007/0009806 A1 | 1/2007 | Kim |
| 2007/0042267 A1 | 2/2007 | Kim et al. |
| 2008/0241702 A1 | 10/2008 | Takahashi |
| 2009/0098456 A1 * | 4/2009 | Park et al. ............. 429/200 |

(Continued)

FOREIGN PATENT DOCUMENTS

| | | |
|---|---|---|
| CN | 1465117 A | 12/2003 |
| EP | 1 143 550 A | 10/2001 |

(Continued)

OTHER PUBLICATIONS

Chinese First Office Action in CN 200910262381.X, dated Feb. 16, 2012 (Kim, et al.).

(Continued)

*Primary Examiner* — Laura Weiner
(74) *Attorney, Agent, or Firm* — Lee & Morse, P.C.

(57) ABSTRACT

An electrolyte for a rechargeable lithium battery and a rechargeable lithium battery including the same, the electrolyte including a lithium salt, a silylborate-based compound, an anhydride component, and a non-aqueous organic solvent.

17 Claims, 8 Drawing Sheets

(56) References Cited

U.S. PATENT DOCUMENTS

| | | |
|---|---|---|
| 2009/0226808 A1 | 9/2009 | Hiwara et al. |
| 2010/0015514 A1 | 1/2010 | Miyagi et al. |

FOREIGN PATENT DOCUMENTS

| | | | |
|---|---|---|---|
| EP | 1 585 142 A | | 10/2005 |
| EP | 1 926 172 A | | 5/2008 |
| JP | 03-236169 A | | 10/1991 |
| JP | 2001-057237 A | | 2/2001 |
| JP | 2001-283908 A | | 10/2001 |
| JP | 2004-047413 A | | 2/2004 |
| JP | 2004-087282 A | | 3/2004 |
| JP | 2004-172101 A | | 6/2004 |
| JP | 2004-259682 A | | 9/2004 |
| JP | 2005-078866 | | 3/2005 |
| JP | 2006-156331 A | | 6/2006 |
| JP | 2007-194207 A | | 8/2007 |
| JP | 2007-194209 A | | 8/2007 |
| JP | 2008-171576 A | | 7/2008 |
| KR | 10-2006-0088950 A | | 8/2006 |
| KR | 10-2007-0021433 A | | 2/2007 |
| KR | 10-2008-0086638 A | | 3/2007 |
| KR | 10-2007-0073386 | * | 7/2007 |
| KR | 10-2007-0073386 A | | 7/2007 |
| WO | WO 2007/043624 A1 | | 4/2007 |

OTHER PUBLICATIONS

European Office Action in EP 10151222.6-2119/2219258, dated Feb. 28, 2012 (Kim, et al.).
EP Office Action in EP P719809EP-HH/NG, dated Apr. 8, 2011 (Kim, et al.).
European Office Action in EP 10151222.6-2119, dated Oct. 18, 2011 (Kim, et al.).
Chinese Second Office Action in 200910262381.X, dated Oct. 22, 2012 (Kim, et al.).
Japanese Office Action in JP 2009-275619, dated Aug. 31, 2012 (Kim, et al.).
Third Chinese Office Action in CN 200910262381.X, dated Mar. 20, 2013, with English Translation (Kim, et al.).
Chinese Decision of Rejection in CN 200910262381.X, dated Sep. 3, 2013, with English translation (Kim, et al.).
Chinese Decision of Rejection in CN 200910262381.X, dated Mar. 25, 2014, with English translation (Kim, et al.).

* cited by examiner

ELECTROLYTE FOR RECHARGEABLE LITHIUM BATTERY AND RECHARGEABLE LITHIUM BATTERY INCLUDING THE SAME

BACKGROUND

1. Field

Embodiments relate to an electrolyte for a rechargeable lithium battery and a rechargeable lithium battery including the same.

2. Description of the Related Art

Recently, interest in high-capacity batteries has been expanded due to development of, e.g., laptops and communication devices. Lithium ion batteries have drawn attention as such batteries. Rechargeable lithium ion batteries may include a positive electrode, a negative electrode, an electrolyte, and a separator.

The positive electrode has widely used $LiCoO_2$, $LiNiO_2$, or $LiCo_xNi_{1-x}O_2$ in which Co is partly substituted with Ni to improve structural stability of $LiNiO_2$, as positive active materials. The negative electrode has widely used a carbon-based material, e.g., crystalline carbon or amorphous carbon as negative active materials.

The electrolyte may play a role of transferring lithium ions between the positive and negative electrodes, and may be required to be stable in the range of voltages at which a battery is operated, as well as to rapidly transfer the ions therebetween. The electrolyte may be prepared by dissolving a lithium salt in an organic solvent.

Recently, there has been active research on such a battery with high capacity and high power corresponding to its increasing demand.

SUMMARY

Embodiments are therefore directed to an electrolyte for a rechargeable lithium battery and a rechargeable lithium battery including the same, which substantially overcome one or more of the problems due to the limitations and disadvantages of the related art.

It is therefore a feature of an embodiment to provide an electrolyte for a rechargeable lithium battery having excellent power and storage characteristics, and a long cycle life.

At least one of the above and other features and advantages may be realized by providing an electrolyte for a rechargeable lithium battery, including a lithium salt, a silylborate-based compound (A) represented by Formula 1:

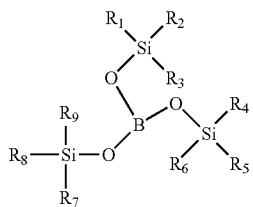

(1)

wherein, in Formula 1, $R_1$ to $R_9$ are each independently hydrogen, a halogen-substituted C1 to C10 alkyl, or an unsubstituted C1 to C10 alkyl, an anhydride component (B) consisting of one or more compounds represented by Formulae 2 to 5:

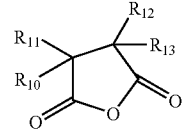

(2)

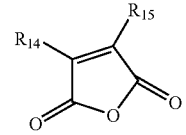

(3)

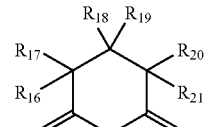

(4)

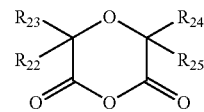

(5)

wherein, in Formulae 2 to 5, $R_{10}$ to $R_{25}$ are each independently hydrogen or a C1 to C10 alkyl, and a non-aqueous organic solvent, wherein the silylborate-based compound (A) and the anhydride component (B) are included at a weight ratio (A/B) of about 0.1 to about 15.

The silylborate-based compound (A) and the anhydride component (B) may be included at a weight ratio (A/B) of about 0.1 to 15.

The silylborate-based compound (A) and the anhydride compound (B) may be included at a weight ratio (A/B) of about 0.5 to about 2.

The organic solvent may include about 15 to about 25 volume % of a cyclic carbonate, and the electrolyte may have a viscosity of about 3.0 to about 3.7 cP at 0° C.

The electrolyte may have a viscosity of about 3.2 to about 3.5 cP at 0° C.

The organic solvent may include about 26 to about 35 volume % of a cyclic carbonate, and the electrolyte may have a viscosity of about 4.0 to about 4.7 cP at 0° C.

The silylborate-based compound (A) may be included in an amount of about 0.05 to about 3 wt % based on the combined weight of the non-aqueous organic solvent and the lithium salt.

The silylborate-based compound (A) may be included in an amount of about 0.5 to about 2 wt % based on the combined weight of the non-aqueous organic solvent and the lithium salt.

The anhydride component (B) may be included in an amount of about 0.3 to about 3 wt % based on the combined weight of the non-aqueous organic solvent and the lithium salt.

The anhydride component (B) may be included in an amount of about 0.3 to about 2 wt % based on the combined weight of the non-aqueous organic solvent and the lithium salt.

$R_1$ to $R_9$ may each independently be hydrogen, a halogen-substituted C1 to C3 alkyl or an unsubstituted C1 to C3 alkyl.

The anhydride component (B) may include at least one of succinic anhydride, methyl succinic anhydride, dimethyl succinic anhydride, maleic anhydride, glutaric anhydride, and diglycoric anhydride.

The anhydride component (B) may include at least one of succinic anhydride, methyl succinic anhydride, and dimethyl succinic anhydride.

At least one of the above and other features and advantages may also be realized by providing a rechargeable lithium battery, including a positive electrode, a negative electrode, and an electrolyte including a lithium salt, a silylborate-based compound (A) represented by Formula 1:

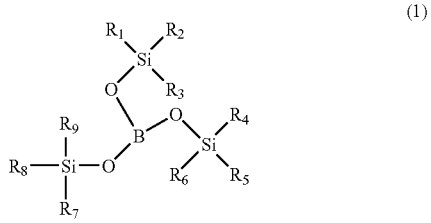

(1)

wherein, in Formula 1, $R_1$ to $R_9$ are each independently hydrogen, a halogen-substituted C1 to C10 alkyl, or an unsubstituted C1 to C10 alkyl, an anhydride component (B) consisting of one or more compounds represented by Formulae 2 to 5:

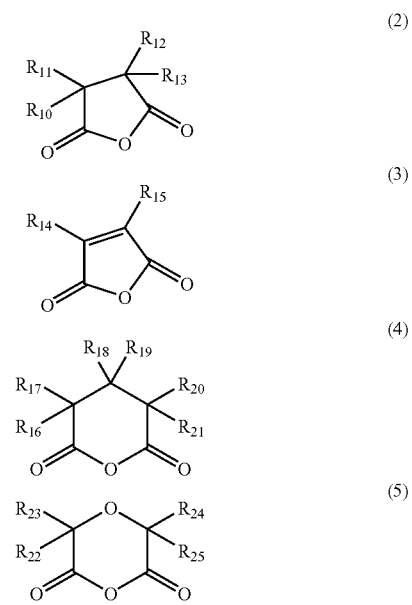

wherein, in Formulae 2 to 5, $R_{10}$ to $R_{25}$ are each independently hydrogen or a C1 to C10 alkyl, and a non-aqueous organic solvent, wherein the silylborate-based compound (A) and the anhydride component (B) are included at a weight ratio (A/B) of about 0.1 to about 15.

The silylborate-based compound (A) and the anhydride component (B) may be included at a weight ratio (A/B) of about 0.5 to about 2.

The organic solvent may include about 15 to about 25 volume % of a cyclic carbonate, and the electrolyte may have a viscosity of about 3.0 to about 3.7 cP at 0° C.

The electrolyte may have a viscosity of about 3.2 to about 3.5 cP at 0° C.

The organic solvent may include about 26 to about 35 volume % of a cyclic carbonate, and the electrolyte may have a viscosity of about 4.0 to about 4.7 cP at 0° C.

The silylborate-based compound (A) may be included in an amount of about 0.05 to about 3 wt % based on the combined weight of the non-aqueous organic solvent and the lithium salt.

The silylborate-based compound (A) may be included in an amount of about 0.5 to about 2 wt % based on the combined weight of the non-aqueous organic solvent and the lithium salt.

The anhydride component (B) may be included in an amount of about 0.3 to about 3 wt % based on the combined weight of the non-aqueous organic solvent and the lithium salt.

The anhydride component (B) may be included in an amount of about 0.3 to about 2 wt % based on the combined weight of the non-aqueous organic solvent and the lithium salt.

$R_1$ to $R_9$ may each independently be hydrogen, a halogen-substituted C1 to C3 alkyl or an unsubstituted C1 to C3 alkyl.

The anhydride component (B) may include at least one of succinic anhydride, methyl succinic anhydride, dimethyl succinic anhydride, maleic anhydride, glutaric anhydride, and diglycoric anhydride.

The anhydride component (B) may include at least one of succinic anhydride, methyl succinic anhydride, and dimethyl succinic anhydride.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
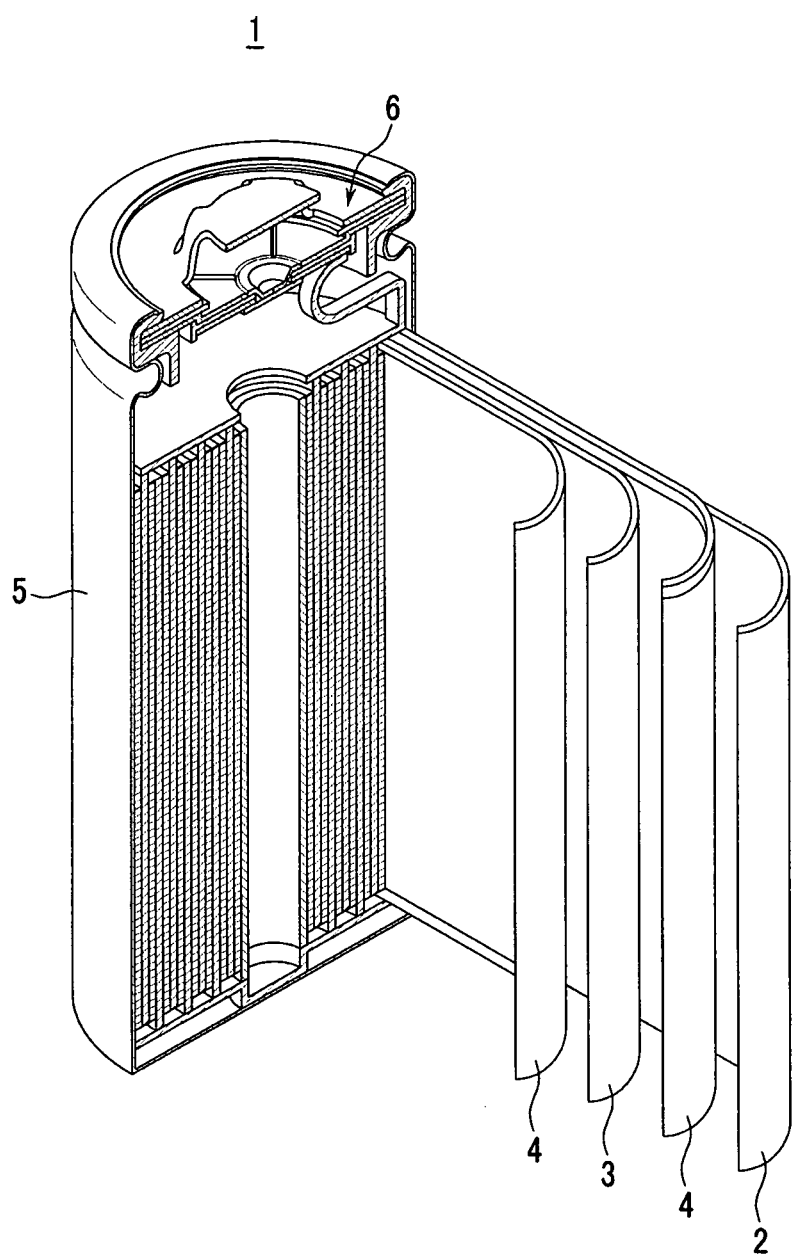
FIG. 1 illustrates a schematic view of a representative structure of a rechargeable lithium battery.

Korean Patent Application No. 10-2009-0005705, filed on Jan. 22, 2009, in the Korean Intellectual Property Office, and entitled: "Electrolyte for Rechargeable Lithium Battery and Rechargeable Lithium Battery Including Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Exemplary embodiments will hereinafter be described in detail. However, these embodiments are only exemplary, and are not limited thereto.

The electrolyte for a rechargeable lithium battery according to an embodiment may include a lithium salt, a non-aqueous organic solvent, a silylborate-based compound, and an anhydride component. The silylborate-based compound may be represented by the following Formula 1:

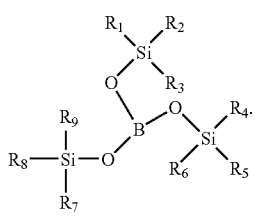

(1)

In Formula 1, $R_1$ to $R_9$ may each independently be hydrogen, a halogen-substituted C1 to C10 alkyl, or an unsubstituted C1 to C10 alkyl. In an implementation, $R_1$ to $R_9$ may each independently be hydrogen, a halogen-substituted C1 to C3 alkyl, or an unsubstituted C1 to C3 alkyl. In another embodiment, $R_1$ to $R_9$ may each independently be hydrogen or an unsubstituted C1 to C3 alkyl. In further embodiments, $R_1$ to $R_9$ may each independently be an unsubstituted C1 to C3 alkyl.

The anhydride component may be made up of at least one compound represented by the following Formulae 2 to 5:

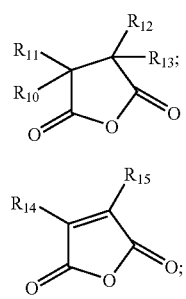

(2)

(3)

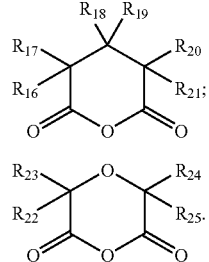

(4)

(5)

In Formulae 2 to 5, $R_{10}$ to $R_{25}$ may each independently be hydrogen or a C1 to C10 alkyl.

The anhydride component may include, e.g., succinic anhydride, methyl succinic anhydride, dimethyl succinic anhydride, maleic anhydride, glutaric anhydride, diglycoric anhydride, or combinations thereof. Preferably, the anhydride component includes at least one of succinic anhydride, methyl succinic anhydride, and dimethyl succinic anhydride. More preferably, the anhydride component includes succinic anhydride.

The silylborate-based compound (A) and the anhydride component (B) may be included at a weight ratio (A/B) of about 0.1 to about 15. Preferably, the weight ratio A/B is about 0.5 to about 2.

The silylborate-based compound may be included in an amount of about 0.05 to about 3 wt % based on the entire weight of non-aqueous organic solvent and lithium salt. Preferably, the silylborate-based compound is included in an amount of about 0.5 to about 2 wt % based on the entire weight, i.e., combined weight, of non-aqueous organic solvent and lithium salt. Maintaining the amount of the silylborate-based compound within these amounts may help ensure that it is appropriately dissolved and may improve interface characteristics between the negative electrode and the electrolyte.

The anhydride component may be included in an amount of about 0.3 to about 3 wt % based on the entire weight of non-aqueous organic solvent and lithium salt. Preferably, the anhydride component is included in an amount of about 0.3 to about 2 wt % based on the entire weight of non-aqueous organic solvent and lithium salt. Maintaining the amount of the anhydride component within these amounts may help improve storage characteristics without excessively increasing resistance when the battery is allowed to stand.

Accordingly, embodiments may provide a high-power battery including the electrolyte having improved reactivity without an undesirable side reaction, and also having no undesirable capacity decrease when the battery is allowed to stand at a high temperature.

These effects may be accomplished when the electrolyte includes both a silylborate-based compound represented by Formula 1 and the anhydride component of at least one compound represented by Formulae 2 to 5.

According to an embodiment, the silylborate-based compound may improve interface characteristics between a negative electrode and an electrolyte, and may thereby decrease battery resistance while enhancing its power output. However, when the silylborate-based compound is added to an electrolyte without the anhydride component, reactivity in the interface may increase, thereby undesirably increasing resistance when the battery is allowed to stand or during charging/discharging cycles.

When the anhydride component is added to an electrolyte without the silylborate-based compound, it may exhibit sharply decreased power output due to large initial battery resistance. It may, however, improve storage characteristics when the battery is allowed to stand, and may decrease resistance during repeated charging/discharging cycles.

Therefore, when the silylborate-based compound and the anhydride component are respectively used alone, they may not be able to satisfy requirements for a high-power battery. However, when they are used together, the battery may have decreased resistance without undesirable large initial resistance due to their particular physical and chemical characteristics, even when allowed to stand or during consecutive charging/discharging cycles.

The aforementioned effects may be accomplished when the silylborate-based compound and the anhydride component are used in an optimal ratio. The silylborate-based compound (A) and the anhydride component (B) may be mixed in a weight ratio (A/B) of about 0.1 to about 15 in the electrolyte. Preferably, the (A/B) ratio in the electrolyte is about 0.5 to about 2.

Maintaining the weight of the silylborate-based compound (A) at about 0.1 times the weight of the anhydride component (B) or greater may help ensure that the silylborate-based compound acts to activate the interaction between the negative and positive electrodes and an electrolyte, thereby beneficially decreasing battery resistance. This resistance decrease effect may be particularly great at low temperatures. In general, an electrolyte may have a sharply increased viscosity at a low temperature, undesirably decreasing lithium ion mobility and ion conductivity. A battery of an embodiment including the silylborate-based compound may have an excellent decrease in resistance at a low temperature. Maintaining the amount of the silylborate-based compound at about 15 times the amount of the anhydride component or less may help ensure that the reactivity of an active material is not unduly increased and storage characteristics at a high temperature are maintained.

Maintaining the amount of the anhydride component within the above amounts may help ensure that a stable SEI (solid electrolyte interface) film may be formed on the surface of a negative electrode through reaction of the anhydride and the negative electrode. Also, maintaining the amount of the anhydride component within the above amounts may also help ensure that the SEI film is not too thick, which, although may improve storage characteristics, it may also undesirably prevent movement of lithium ions at a low temperature, deteriorating power output.

Considering the aforementioned conditions, the silylborate-based compound (A) and the anhydride component (B) may be included in the electrolyte at a weight ratio (A/B) of about 0.1 to about 15. Preferably, they are included a weight ratio (A/B) of about 0.5 to about 2.

The non-aqueous organic solvent may act as a medium for transmitting ions taking part in the electrochemical reaction of a battery. The non-aqueous organic solvent may include, e.g., a cyclic carbonate, and may have an appropriately controlled viscosity depending on various contents of the cyclic carbonate. The cyclic carbonate may include, e.g., ethylene carbonate, propylene carbonate, butylene carbonate, vinylene carbonate, vinylethylene carbonate, or combinations thereof. Preferably, the cyclic carbonate includes ethylene carbonate. In an embodiment, when the organic solvent in the electrolyte includes about 15 to about 25 volume % of a cyclic carbonate, the electrolyte may have a viscosity of about 3.0 to about 3.7 cP at 0° C. Preferably, the viscosity is about 3.2 to about 3.5 cP at 0° C.

In another embodiment, when the solvent includes about 26 to about 35 volume % of a cyclic carbonate, the electrolyte may have a viscosity of about 4.0 to about 4.7 cP at 0° C. Preferably, the viscosity is about 4.2 to about 4.5 cP at 0° C.

According to an embodiment, the electrolyte including the non-aqueous organic solvent and the silylborate-based compound (A) and the anhydride component (B) in a weight ratio (A/B) of about 0.1 to about 15 and having the viscosity within the above amounts may provide a battery having improved reactivity without undesirable side reactions, having no undesirable capacity fading when allowed to stand at a high temperature, and exhibiting high power.

The non-aqueous solvent may further include a linear carbonate along with the cyclic carbonate. The linear carbonate may include, e.g., dimethyl carbonate, diethyl carbonate, dipropyl carbonate, methylpropyl carbonate, ethylpropyl carbonate, methylethyl carbonate, or combinations thereof.

In an implementation, the non-aqueous solvent may further include at least one of an ester-based, an ether-based, a ketone-based, an alcohol-based, or an aprotic solvent. The ester-based solvent may include, e.g., methyl acetate, ethyl acetate, n-propyl acetate, dimethylacetate, methylpropionate, ethylpropionate, γ-butyrolactone, decanolide, valerolactone, mevalonolactone, caprolactone, etc. The ether-based solvent may include, e.g., dibutyl ether, tetraglyme, diglyme, dimethoxyethane, 2-methyltetrahydrofuran, tetrahydrofuran, etc. The ketone-based solvent may include, e.g., cyclohexanone and so on. The alcohol-based solvent may include, e.g., ethyl alcohol, isopropyl alcohol, etc. The aprotic solvent may include, e.g., nitriles such as R—CN (wherein R is a C2 to C20 linear, branched, or cyclic hydrocarbon, which may include a double bond, an aromatic ring, or an ether bond), amides such as dimethylformamide, dioxolanes such as 1,3-dioxolane, sulfolanes, and so on.

The non-aqueous organic solvent may be used singularly or in a mixture. When the organic solvent is used in a mixture, a mixture ratio may be controlled in accordance with a desired battery performance.

The non-aqueous organic solvent may further include an aromatic hydrocarbon-based organic solvent. The aromatic hydrocarbon-based organic solvent may be represented by Formula 6:

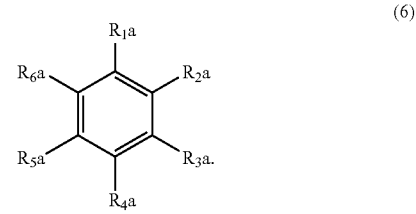

(6)

In Formula 6, $R_{1a}$ to $R_{6a}$ may each independently be hydrogen, a halogen, a C1 to C10 alkyl, a C1 to C10 haloalkyl, or combinations thereof.

The aromatic hydrocarbon-based organic solvent may include, e.g., benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or combinations thereof.

The non-aqueous electrolyte may further include vinylene carbonate or an ethylene carbonate-based compound represented by Formula 7:

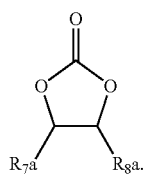

(7)

In Formula 7, $R_{7a}$ and $R_{8a}$ may each independently be hydrogen, a halogen, a cyano (CN), a nitro ($NO_2$), or a C1 to C5 fluoroalkyl, provided that at least one of $R_{7a}$ and $R_{8a}$ is a halogen, a nitro ($NO_2$), or a C1 to C5 fluoroalkyl and $R_{7a}$ and $R_{8a}$ are not simultaneously hydrogen.

The ethylene carbonate-based compound represented by Formula 7 may include, e.g., difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The additive may be included in an amount that may be adjusted in order to improve cycle life.

The lithium salt may supply lithium ions by being dissolved in the organic solvent and basically operating a rechargeable lithium battery. The lithium salt may promote movement of lithium ions between positive and negative electrodes. The lithium salt may include, e.g., $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $Li(CF_3SO_3)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ ($LiB(C_2O_4)_2$ being lithium bisoxalate borate, "LiBOB").

The lithium salt concentration in the electrolyte may be about 0.1 to about 1.4 M. Maintaining the lithium salt concentration at about 0.1 M or greater may help ensure that electrolyte performance is not reduced due to low electrolyte conductivity. Maintaining the lithium salt concentration at about 1.4 M or less may help ensure that lithium ion mobility is not reduced due to a viscosity increase of the electrolyte.

According to an embodiment, a rechargeable lithium battery may include positive and negative electrodes as well as the electrolyte. The negative electrode may include a current collector and a negative active material layer disposed thereon. The negative active material layer may include a negative active material. The negative active material may include a material that reversibly intercalates/deintercalates lithium ions, a lithium metal, a lithium metal alloy, a material being capable of doping lithium, or a transition metal oxide.

The material that may reversibly intercalate/deintercalate lithium ions may include, e.g., a carbon material. The carbon material may include any suitable carbon-based negative active material in a lithium ion rechargeable battery. The carbon material may include, e.g., crystalline carbon, amorphous carbon, and mixtures thereof. The crystalline carbon may include, e.g., non-shaped, or sheet, flake, spherical, or fiber shaped natural graphite or artificial graphite. The amorphous carbon may include, e.g., a soft carbon (carbon obtained through sintering at a low temperature), a hard carbon (carbon obtained through sintering at a high temperature), mesophase pitch carbide, fired coke, and so on.

The lithium metal alloy may include lithium and a metal including at least one of Na, K, Rb, Cs, Fr, Be, Mg, Ca, Sr, Si, Sb, Pb, In, Zn, Ba, Ra, Ge, Al, and Sn. The material being capable of doping lithium may include, e.g., Si, $SiO_x$ (0<x<2), a Si—Y alloy (where Y is an element including at least one of an alkali metal, an alkaline-earth metal, a group 13 element, a group 14 element, a transition element, a rare earth element, and is not Si), Sn, $SnO_2$, a Sn—Y alloy (where Y is an element including at least one of an alkali metal, an alkaline-earth metal, a group 13 element, a group 14 element, a transition element, a rare earth element, and is not Sn), or mixtures thereof. At least one of these materials may be mixed with $SiO_2$. The element Y may include, e.g., Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof. At least one of these materials may be mixed with $SiO_2$. The transition metal oxide may include, e.g., vanadium oxide, lithium vanadium oxide, and the like.

The negative active material layer may include, e.g., a binder, and optionally a conductive material. The binder may improve binding properties of negative active material particles with one another and with a current collector. The binder may include, e.g., polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may be included to improve electrode conductivity. Any suitable electrically conductive material may be used as a conductive material as long as it does not cause an undesirable chemical change. The conductive material may include, e.g., natural graphite, artificial graphite, carbon black, acetylene black, ketjen black, carbon fiber, a metal powder or a metal fiber including copper, nickel, aluminum, silver, and so on, a polyphenylene derivative, or mixtures thereof.

The current collector may include, e.g., a copper foil, a nickel foil, a stainless steel foil, a titanium foil, a nickel foam, a copper foam, a polymer substrate coated with a conductive metal, and combinations thereof.

The positive electrode may include a current collector and a positive active material layer disposed on the current collector. The current collector may include, e.g., Al, but is not limited thereto. The positive active material may include, e.g., lithiated intercalation compounds that may reversibly intercalate and deintercalate lithium ions. The positive active material may include, e.g., a composite oxide including at least one of cobalt, manganese, and nickel, as well as lithium. In particular, the following lithium-containing compounds may be used:

$Li_aA_{1-b}X_bD_2$ (0.95≤a≤1.1 and 0≤b≤0.5); $Li_aE_{1-b}X_bO_{2-c}D_c$ (0.95≤a≤1.1, 0≤b≤0.5, and 0≤c≤0.05); $LiE_{2-b}X_bO_{4-c}D_c$ (0≤b≤0.5 and 0≤c≤0.05); $Li_aNi_{1-b-c}Co_bX_cD_\alpha$ (0.95≤a≤1.1, 0≤b≤0.5, 0≤c≤0.05, and 0<α≤2); $Li_aNi_{1-b-c}Co_bX_cO_{2-\alpha}T_\alpha$ (0.95≤a≤1.1, 0≤b≤0.5, 0≤c≤0.05, and 0<α≤2); $Li_aNi_{1-b-c}Co_bX_cO_{2-\alpha}T_2$ (0.95≤a≤1.1, 0≤b≤0.5, 0≤c≤0.05, and 0<α<2); $Li_aNi_{1-b-c}Mn_bX_cD_\alpha$ (0.95≤a≤1.1, 0≤b≤0.5, 0≤c≤0.05, and 0<α≤2); $Li_aNi_{1-b-c}Mn_bX_cO_{2-\alpha}T_\alpha$ (0.95≤a≤1.1, 0≤b≤0.5, 0≤c≤0.05, and 0<α<2); $Li_aNi_{1-b-c}Mn_bX_cO_{2-\alpha}T_2$ (0.95≤a≤1.1, 0≤b≤0.5, 0≤c≤0.05, and 0<α<2); $Li_aNi_bE_cG_dO_2$ (0.90≤a≤1.1, 0≤b≤0.9, 0≤c≤0.5, and $0.001 \leq d \leq 0.1$); $Li_aNi_bCo_cMn_dGeO_2$ ($0.90 \leq a \leq 1.1$, $0 \leq b \leq 0.9$, $0 \leq c \leq 0.5$, $0 \leq d \leq 0.5$, and $0.001 \leq e \leq 0.1$); $Li_aNiG_bO_2$ ($0.90 \leq a \leq 1.1$ and $0.001 \leq b \leq 0.1$); $Li_aCoG_bO_2$ ($0.90 \leq a \leq 1.1$ and $0.001 \leq b \leq 0.1$); $Li_aMnG_bO_2$ ($0.90 \leq a \leq 1.1$ and $0.001 \leq b \leq 0.1$); $Li_aMn_2G_bO_4$ ($0.90 \leq a \leq 1.1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above formulas, A may include, e.g., Ni, Co, Mn, and combinations thereof; X may include, e.g., Al, Ni, Co, Mn, Cr, Fe, Mg, Sr, V, a rare earth element, and combinations thereof; D may include, e.g., O, F, S, P, and combinations thereof; E may include, e.g., Co, Mn, and combinations thereof; T may include, e.g., F, S, P, and combinations thereof; G may include, e.g., Al, Cr, Mn, Fe, Mg, La, Ce, Sr, V, and combinations thereof; Q may include, e.g., Ti, Mo, Mn, and combinations thereof; I may include, e.g., Cr, V, Fe, Sc, Y, and combinations thereof; and J may include, e.g., V, Cr, Mn, Co, Ni, Cu, and combinations thereof.

The compound may have a coating layer on the surface, or may be mixed with another compound having a coating layer. The coating layer may include coating element compound including, e.g., an oxide of a coating element, a hydroxide, an oxyhydroxide of a coating element, an oxycarbonate of a coating element, and a hydroxyl carbonate of a coating element. The compound for a coating layer may be amorphous or crystalline. The coating element for a coating layer may include, e.g., Mg, Al, Co, K, Na, Ca, Si, Ti, V, Sn, Ge, Ga, B, As, Zr, or mixtures thereof. The coating layer may be formed in a method having no adverse influence on properties of a positive active material by including these elements in the compound. The method may include any suitable coating method, e.g., spray coating, dipping, and the like, but is not illustrated in more detail, since it is well-known to those who work in the related field.

The positive active material layer may also include a binder and a conductive material. The binder may improve binding properties of the positive active material particles to one another, and also with a current collector. The binder may include, e.g., polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may be included to improve electrode conductivity. Any suitable electrically conductive material may be used as a conductive material as long as it does not cause an undesirable chemical change. The conductive material may include, e.g., natural graphite, artificial graphite, carbon black, acetylene black, ketjen black, a carbon fiber, a metal powder or a metal fiber including copper, nickel, aluminum, silver, and so on, and a polyphenylene derivative.

The negative and positive electrodes may be fabricated by a method including, e.g., mixing the active material, a conductive material, and a binder into an active material composition, and coating the composition on a current collector. The electrode manufacturing method is well known, and thus is not described in detail. The solvent may include, e.g., N-methylpyrrolidone.

The rechargeable lithium battery may further include a separator between the positive and negative electrodes, as needed. The separator may include any suitable material used in conventional lithium secondary batteries. Non-limiting examples of suitable separator materials may include, e.g., polyethylene, polypropylene, polyvinylidene fluoride, and multi-layers thereof, e.g., a polyethylene/polypropylene double-layered separator, a polyethylene/polypropylene/polyethylene three-layered separator, and a polypropylene/polyethylene/polypropylene three-layered separator.

FIG. 1 illustrates a schematic view of a representative structure of a rechargeable lithium battery. FIG. 1 illustrates a rechargeable lithium battery 1, which includes a positive electrode 3, a negative electrode 2, a separator 4 interposed between the positive electrode 3 and the negative electrode 2, an electrolyte (not shown) impregnating the separator 4, a battery case 5, and a sealing member 6 sealing the battery case 5.

The following examples illustrate the embodiments in more detail. These examples, however, should not in any sense be interpreted as limiting the scope.

Example 1

A positive active material slurry was prepared by dispersing a lithium nickel cobalt aluminum composite oxide (Li(Ni$_x$CO$_y$Al$_z$)O$_2$, where x=0.8, y=0.15, z=0.05), a positive active material, and a denka black conductive material in a solution prepared by dissolving a polyvinylidene fluoride binder in an N-methyl-2-pyrrolidone solvent. The positive active material, the conductive material, and the binder were mixed in a weight ratio of 84.5:8.5:7. The positive active material slurry was coated on an aluminum current collector, and then dried and compressed to fabricate a positive electrode.

A negative active material slurry was prepared by dispersing a natural graphite negative active material (MPG111, Mitsubishi Chemical Co.) in a solution prepared by dissolving a polyvinylidene fluoride binder in an N-methyl-2-pyrrolidone solvent. The negative active material and the binder were mixed in a weight ratio of 94:6. The negative active material slurry was coated on a copper current collector, and then dried and compressed to fabricate a negative electrode.

The positive and negative electrodes were used together with a porous polypropylene resin separator and an electrolyte to fabricate a rechargeable lithium cell. The electrolyte was prepared by adding LiPF$_6$ to a non-aqueous solvent including ethylene carbonate/ethylmethyl carbonate/diethyl carbonate in a volume ratio of 3/4/3 to prepare a 1.15 M solution. Then, trimethylsilyl borate and succinic anhydride were added.

The trimethylsilyl borate (A) and the succinic anhydride (B) had a weight ratio (A/B) of 15. The trimethylsilyl borate was included in an amount of 3 wt % based on the weight of the non-aqueous organic solvent and lithium salt. The succinic anhydride was included in an amount of 0.2 wt %. The electrolyte had a viscosity of 4.03 cP at 0° C.

Example 2

A rechargeable lithium cell was fabricated according to the same method as Example 1 except for using an electrolyte prepared by mixing trimethylsilyl borate (A) and succinic anhydride (B) in a weight ratio (A/B) of 1. The trimethylsilyl borate was included in an amount of 0.5 wt % based on the weight of the non-aqueous organic solvent and lithium salt. The succinic anhydride was included in an amount of 0.5 wt %. The electrolyte had a viscosity of 4.33 cP at 0° C.

Example 3

A rechargeable lithium cell was fabricated according to the same method as Example 1 except for using an electrolyte prepared by mixing trimethylsilyl borate (A) and succinic anhydride (B) in a weight ratio (A/B) of 10. The trimethylsilyl borate was included in an amount of 2 wt % based on the weight of the non-aqueous organic solvent and lithium salt. The succinic anhydride was included in an amount of 0.2 wt %. The electrolyte had a viscosity of 4.13 cP at 0° C.

Example 4

A rechargeable lithium cell was fabricated according to the same method as Example 1 except for using an electrolyte prepared by mixing trimethylsilyl borate (A) and succinic anhydride (B) in a weight ratio (A/B) of 5. The trimethylsilyl borate was included in an amount of 1 wt % based on the weight of the non-aqueous organic solvent and lithium salt. The succinic anhydride was included in an amount of 0.2 wt %. The electrolyte had a viscosity of 4.21 cP at 0° C.

Example 5

A rechargeable lithium cell was fabricated according to the same method as Example 1 except for using an electrolyte prepared by mixing trimethylsilyl borate (A) and succinic anhydride (B) in a weight ratio (A/B) of 0.1. The trimethylsilyl borate was included in an amount of 0.07 wt % based on the weight of the non-aqueous organic solvent and lithium salt. The succinic anhydride was included in an amount of 0.7 wt %. The electrolyte had a viscosity of 4.36 cP at 0° C.

Example 6

A rechargeable lithium cell was fabricated according to the same method as Example 1 except for using an electrolyte prepared by mixing trimethylsilyl borate (A) and succinic anhydride (B) in a weight ratio (A/B) of 0.2. The trimethylsilyl borate was included in an amount of 0.2 wt % based on the weight of the non-aqueous organic solvent and lithium salt. The succinic anhydride was included in an amount of 1 wt %. The electrolyte had a viscosity of 4.35 cP at 0° C.

Example 7

A rechargeable lithium cell was fabricated according to the same method as Example 1 except for using an electrolyte prepared by mixing trimethylsilyl borate (A) and succinic anhydride (B) in a weight ratio (A/B) of 0.5. The trimethylsilyl borate was included in an amount of 0.5 wt % based on the weight of the non-aqueous organic solvent and lithium salt. The succinic anhydride was included in an amount of 1 wt %. The electrolyte had a viscosity of 4.34 cP at 0° C.

Example 8

A rechargeable lithium cell was fabricated according to the same method as Example 1 except for using an electrolyte prepared by mixing trimethylsilyl borate (A) and succinic anhydride (B) in a weight ratio (A/B) of 2. The trimethylsilyl borate was included in an amount of 1 wt % based on the weight of the non-aqueous organic solvent and lithium salt. The succinic anhydride was included in an amount of 0.5 wt %. The electrolyte had a viscosity of 4.32 cP at 0° C.

Comparative Example 1

A rechargeable lithium cell was fabricated according to the same method as Example 1 except for using an electrolyte prepared by adding $LiPF_6$ to a non-aqueous organic solvent including ethylene carbonate/ethylmethyl carbonate/diethyl carbonate in a volume ratio of 3/4/3 to prepare a 1.15 M solution without including trimethylsilyl borate and succinic anhydride. The electrolyte had a viscosity of 4.28 cP at 0° C.

Comparative Example 2

A rechargeable lithium cell was fabricated according to the same method as Example 1 except for using an electrolyte prepared by mixing trimethylsilyl borate (A) and succinic anhydride (B) in a weight ratio (A/B) of 30. The trimethylsilyl borate was included in an amount of 3 wt % based on the weight of the non-aqueous organic solvent and lithium salt. The succinic anhydride was included in an amount of 0.1 wt %. The electrolyte had a viscosity of 3.87 cP at 0° C.

Comparative Example 3

A rechargeable lithium cell was fabricated according to the same method as Example 1 except for using an electrolyte prepared by mixing trimethylsilyl borate (A) and succinic anhydride (B) in a weight ratio (A/B) of 0.03. The trimethylsilyl borate was included in an amount of 0.1 wt % based on the weight of the non-aqueous organic solvent and lithium salt. The succinic anhydride was included in an amount of 3 wt %. The electrolyte had a viscosity of 4.69 cP at 0° C.

Linear Sweep Voltammetry (LSV) Characteristic

Figure 2:
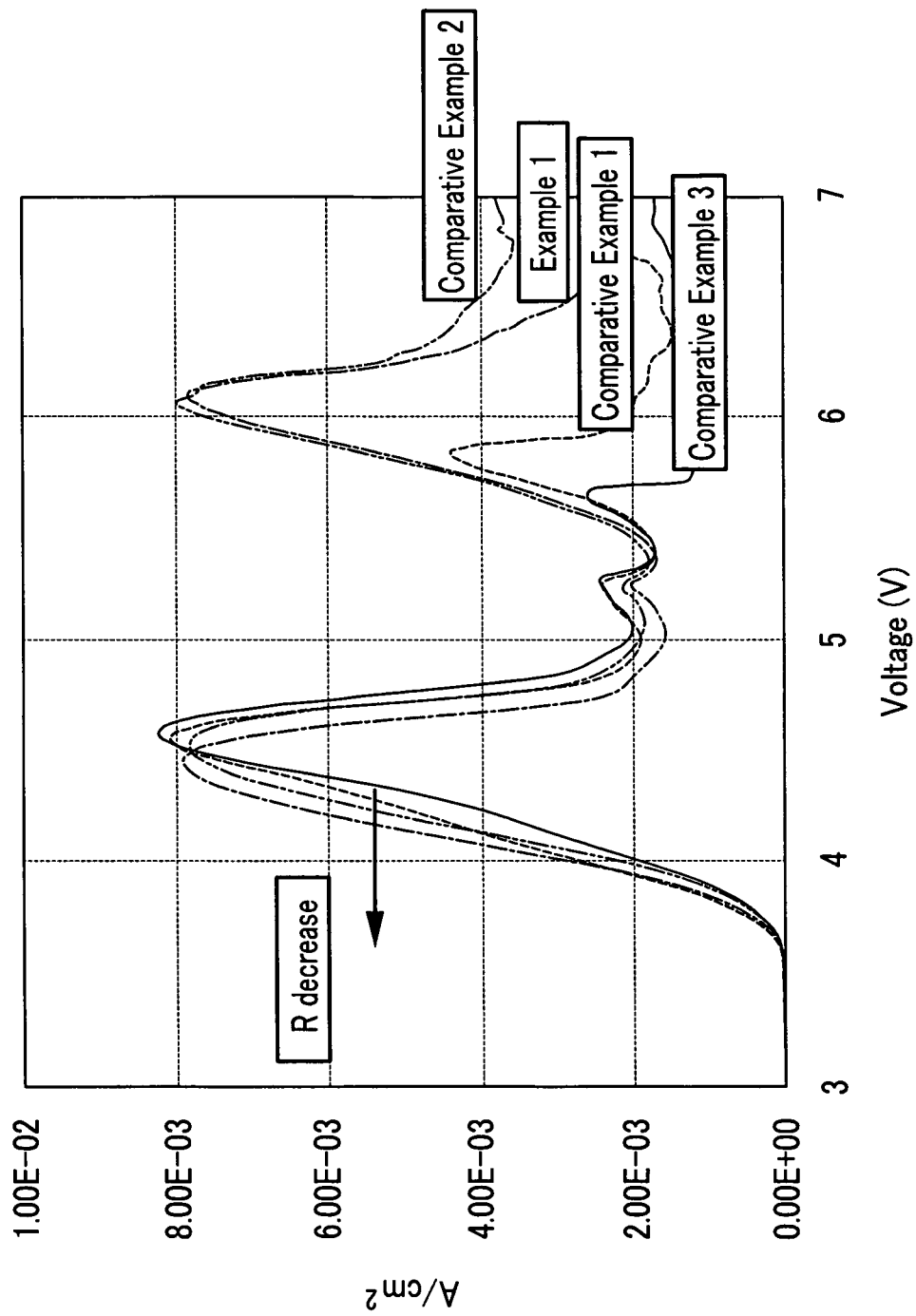
FIG. 2 illustrates a graph showing linear sweep voltammetry (LSV) results of the positive electrodes according to Example 1 and Comparative Examples 1 to 3.

The three electrode-linear sweep voltammetry (LSV) (scanning speed: 1 mV/sec) to the positive electrodes according to Example 1 and Comparative Examples 1 to 3, a lithium metal reference electrode, and a lithium metal as a counter electrode, were measured. The results are illustrated in FIG. 2. As shown in FIG. 2, as trimethylsilyl borate was increasingly added, reactivity improved, and the reaction occurred in a high potential region. The rechargeable lithium cell including an insufficient amount of trimethylsilyl borate (Comparative Example 3) exhibited lower reactivity than the one including no trimethylsilyl borate (Comparative Example 1).

In addition, referring to the peaks at 4 to 5V voltages, the rechargeable lithium cells including succinic anhydride according to Example 1 and Comparative Example 2 had a peak moved toward the left, as the arrow shows, compared with the one including no succinic anhydride according to Comparative Example 1. This means that they had reduced battery resistances (R decrease). In other words, the resistance reduction at the reaction interface (i.e., side reaction suppression) makes a peak move toward a lower potential region during the cyclic voltammetry tests. However, these rechargeable lithium batteries had increased reactivity in a high potential region and had a peak showing a high current flow. In contrast, when the rechargeable lithium cells included succinic anhydride in an excessive amount (Comparative Example 3) resistance reduction was lower than the battery including no succinic anhydride (Comparative Example 1).

As a result, the succinic anhydride turned out to suppress a side reaction, while the trimethylsilyl borate improved reactivity. Accordingly, when they are appropriately used together, they may effectively suppress a side reaction and improve reactivity.

In addition, the three electrode cyclic voltammetries (scanning speed: 1 mV/sec) for the negative electrodes according to Examples 1 and 2 and Comparative Example 2, a lithium metal reference electrode, and a lithium metal as a counter electrode were measured. The results are illustrated in FIG. 3.

Figure 3:
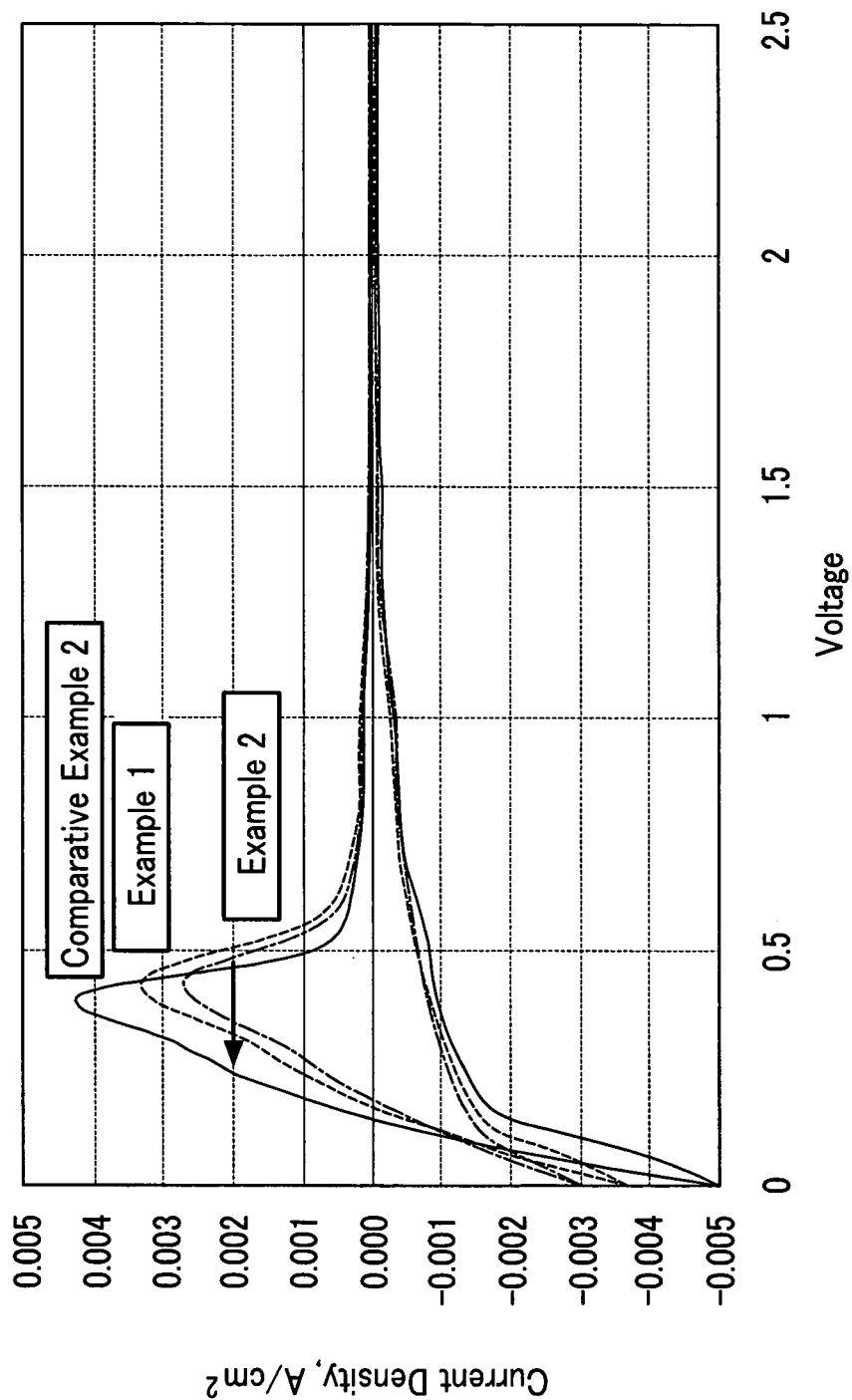
FIG. 3 illustrates a graph showing cyclic voltammetry results of the negative electrodes according to Examples 1 and 2 and Comparative Example 2.

As shown in FIG. 3, when trimethylsilyl borate is included, interface resistances may decrease, as shown in a peak at a current curved line during the charge.

DC Internal Resistance (Low Temperature: −30° C.)

Figure 4:
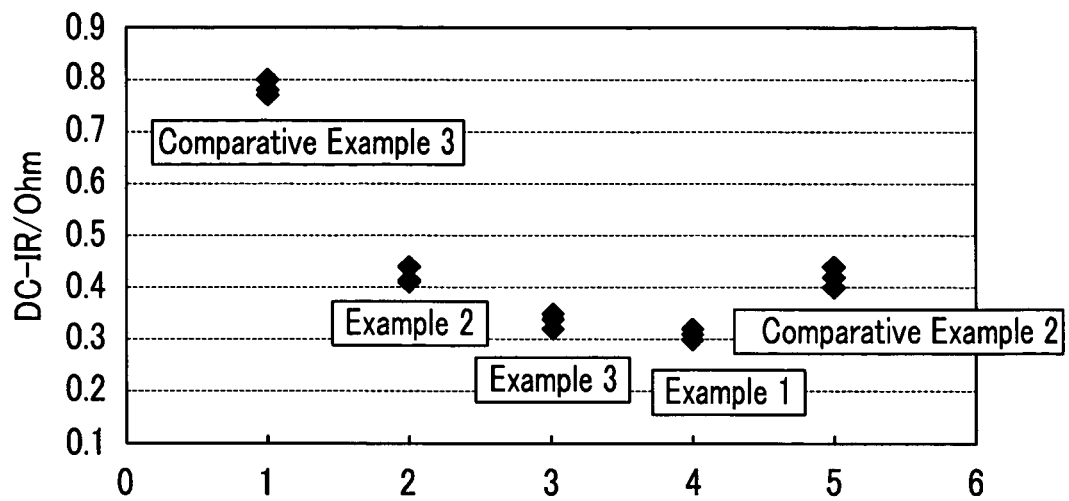
FIG. 4 illustrates a graph showing DC internal resistance of the cells according to Examples 1 to 3 and Comparative Examples 2 and 3 at a low temperature.

The rechargeable lithium cells according to Examples 1 to 3 and Comparative Examples 2 and 3 were measured regarding direct current internal resistance (DCIR) at a low temperature of −30° C. The results are shown in FIG. 4. As shown in FIG. 4, when the rechargeable lithium cell according to Comparative Example 3 included excess succinic anhydride, it exhibited very high resistance. Therefore, it could not have high power output due to the high resistance. As trimethylsilyl borate is increasingly added, it may tend to decrease resistance. However, when the trimethylsilylborate was excessively included (Comparative Example 2), resistance increased. This may be because the trimethylsilyl borate had reduced solubility and thereby increased viscosity. Accordingly, trimethylsilyl borate and succinic anhydride may be appropriately included in a weight ratio of about 0.1 to about 15.

Capacity Change when Standing at a High Temperature

Figure 5:
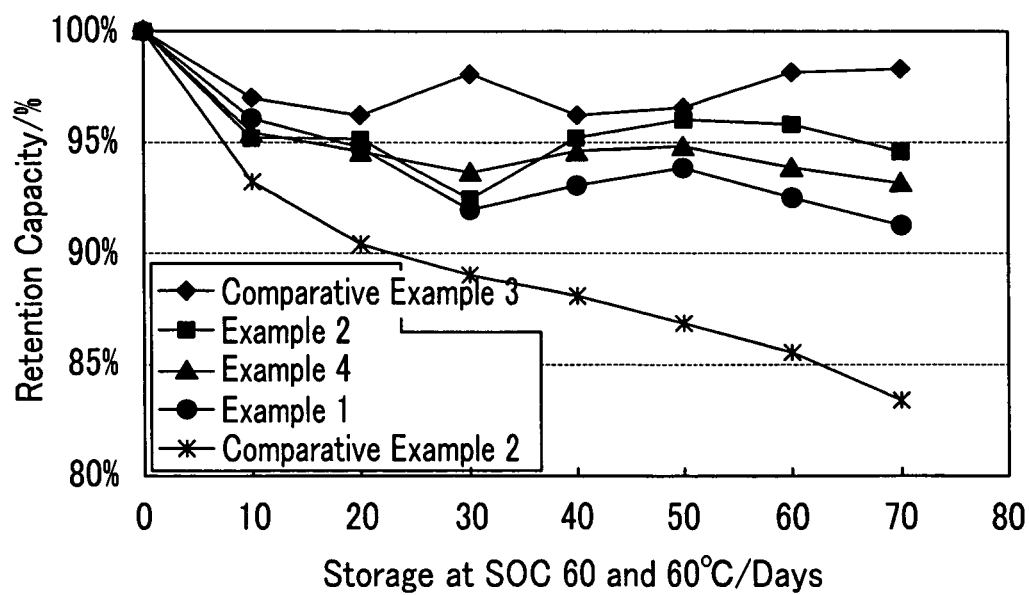
FIG. 5 illustrates a graph showing capacity retention of the cells according to Examples 1, 2, and 4 and Comparative Examples 2 and 3, when they are allowed to stand at a high temperature of 60° C.

The rechargeable lithium cells according to Examples 1, 2, and 4 and Comparative Examples 2 and 3 were allowed to stand at 60° C. for 70 days and measured for their capacity retention. The results are illustrated in FIG. 5. In FIG. 5, SOC 60 indicates that the batteries were 60% charged based on 100% of the entire battery charge. The addition of trimethylsilyl borate decreased initial interface resistance and subsequently battery resistance, and increased power output. However, when the cell was allowed to stand at a high temperature, its power output and capacity sharply decreased. FIG. 5 shows that the more trimethylsilyl borate was added, and the longer a battery was allowed to stand, the more the power output and capacity decreased.

Figure 6:
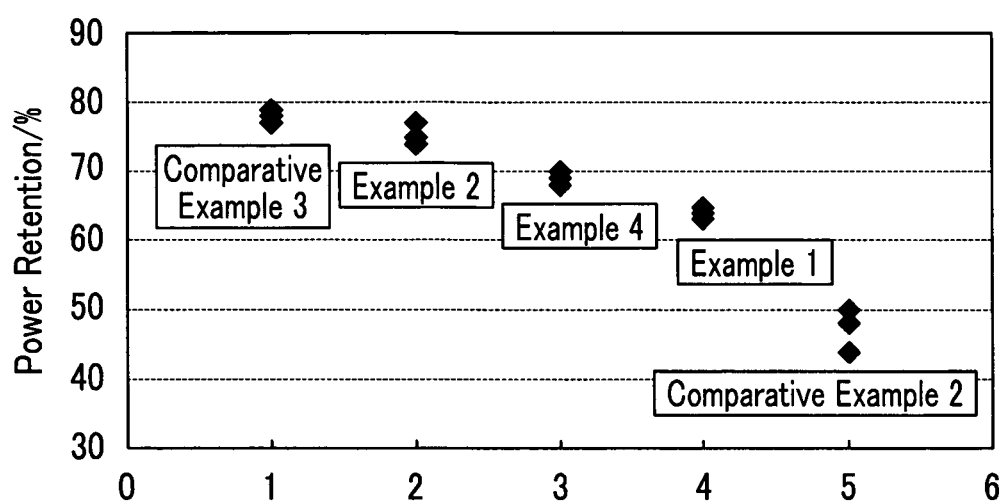
FIG. 6 illustrates a graph showing power retention of the cells according to Examples 1, 2, and 4 and Comparative Examples 2 and 3, when they are allowed to stand at a high temperature of 85° C.

In addition, the cells under SOC 70 condition of Examples 1, 2, and 4 and Comparative Examples 2 and 3 were allowed to stand at 85° C. for 3 days and were then measured for their power-maintaining rate. The results are illustrated in FIG. 6. The SOC 70 indicates that the batteries were 70% charged based on 100% of the entire battery charge. As shown in FIG. 6, when trimethylsilyl borate was excessively included (Comparative Example 2), the battery exhibited a sharp degradation in power.

Initial Impedance

Figure 7:
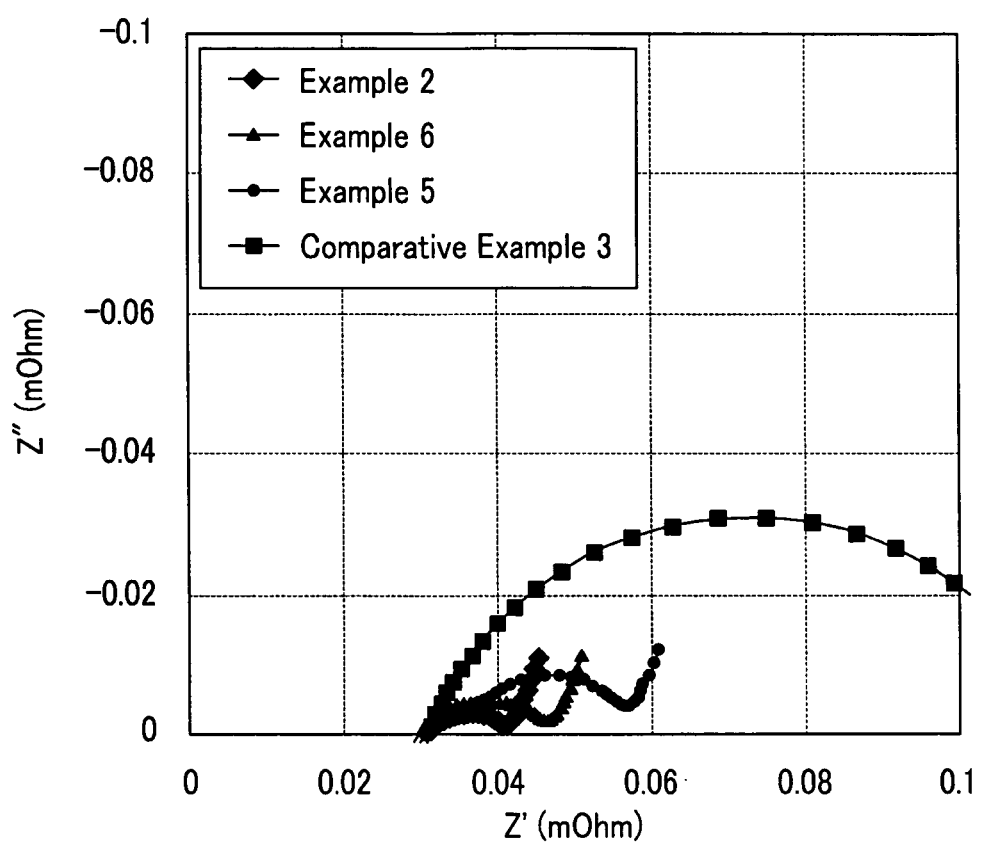
FIG. 7 illustrates a graph showing initial impedance of the cells according to Examples 2, 5, and 6 and Comparative Example 3.

The cells of Examples 2, 5, and 6 and Comparative Example 3 were measured for their initial impedance. The results are illustrated in FIG. 7. The cells included a negative electrode having a succinic anhydride SEI film on the surface. The SEI film worked as a resistor. Accordingly, as the succinic anhydride was increasingly added, resistance increased. This resistance may sharply increase when trimethylsilyl borate and succinic anhydride are included in a weight ratio of 0.1, which may improve storage characteristics. However, when the SEI film is too thick, it may increase resistance too much in a high power battery. Therefore, the SEI film thickness should be regulated. The thickness may be regulated by controlling the amount of trimethylsilyl borate and succinic anhydride. As shown in FIG. 7, Comparative Example 3 included trimethylsilyl borate and succinic anhydride in a weight ratio of 0.03. Accordingly, the succinic anhydride formed an excessively thick SEI, and increased resistance. Therefore, as shown in Example 2, the succinic anhydride and the trimethylsilyl borate may be appropriately included in a weight ratio of about 1 or less.

High Temperature Impedance

Figure 8:
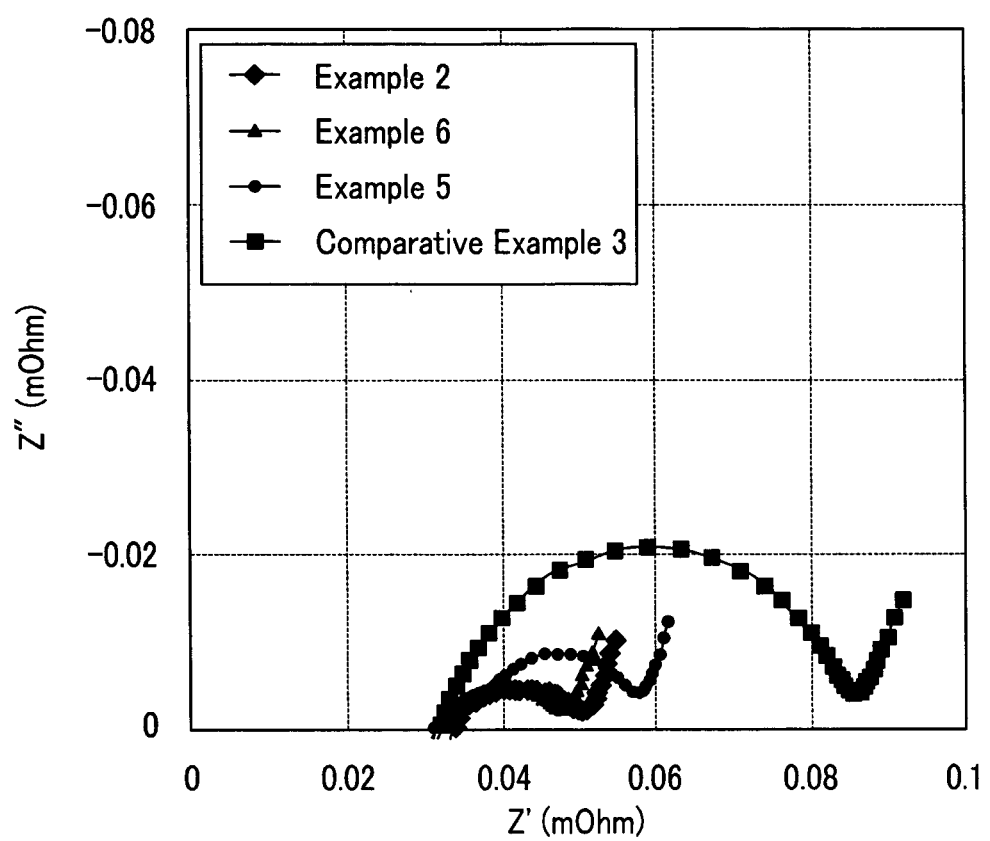
FIG. 8 illustrates a graph showing impedance of the cells according to Examples 2, 5, and 6 and Comparative Example 3, when they are allowed to stand at a high temperature.

The cells under SOC 60 condition of Examples 2, 5, and 6 and Comparative Example 3 were allowed to stand at 60° C. for 50 days and then measured for their impedance. The results are illustrated in FIG. 8. SOC 60 indicates that the batteries were 60% charged based on 100% of the entire battery charge. As shown in FIG. 8, as succinic anhydride was increasingly included, resistances decreased. However, when the succinic anhydride was excessively included as shown in Comparative Example 3, the batteries exhibited less resistance than the initial impedance shown in FIG. 7 but more resistance than the ones of Examples 2, 5, and 6. The results indicated that the amount of the succinic anhydride to be added may be controlled to decrease resistance.

In addition; the same experiment was performed regarding the batteries including succinic anhydride and trimethylsilyl borate in a weight ratio of 0.5 and 2 according to Examples 7 and 8. They had lower resistance than the battery of Comparative Example 3.

Impedance Depending on Charging

Figure 9:
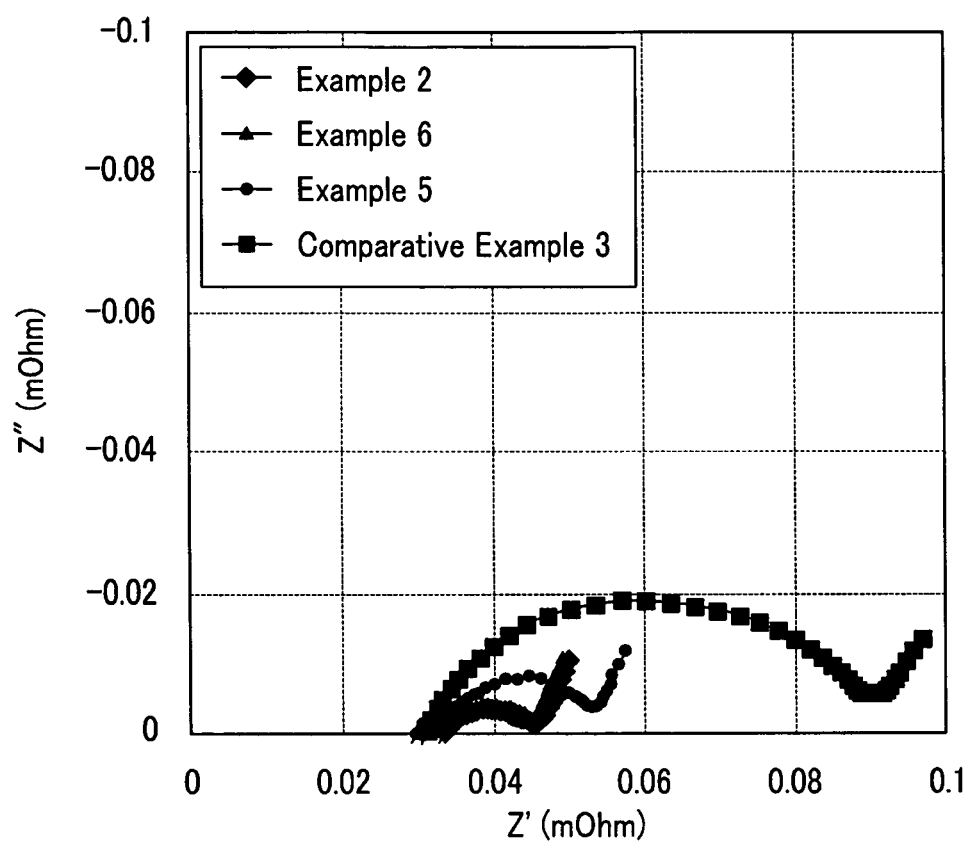
FIG. 9 illustrates a graph showing impedance of the cells according to Examples 2, 5, and 6 and Comparative Example 3, after they are charged and discharged for 10,000 cycles and discharged at 25° C.

The cells of Examples 2, 5, and 6 and Comparative Example 3 were charged and discharged 10,000 times at 25° C. and measured for their impedance. The results are illustrated in FIG. 9. As shown in FIG. 9, when the cell of Comparative Example 3 included excess succinic anhydride, it exhibited high resistance after the 10,000th charge and discharge. When the cells of Examples 2, 5, and 6 included succinic anhydride and trimethylsilyl borate respectively in a weight ratio of 0.1, 1, and 0.2, they exhibited decreased resistance, lower than the initial impedance shown in FIG. 7.

In addition, the same experiment was performed regarding the cells including succinic anhydride and trimethylsilyl borate in a weight ratio of 0.5 and 2 according to Examples 7 and 8. As a result, they also exhibited decreased resistance.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electrolyte for a rechargeable lithium battery, comprising:
 a lithium salt;
 a silylborate-based compound (A) represented by Formula 1:

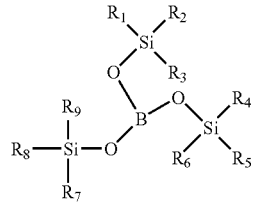

(1)

wherein, in Formula 1, $R_1$ to $R_9$ are each independently hydrogen, a halogen-substituted C1 to C10 alkyl, or an unsubstituted C1 to C10 alkyl;

an anhydride component (B) consisting of one or more compounds represented by Formulae 2 to 5:

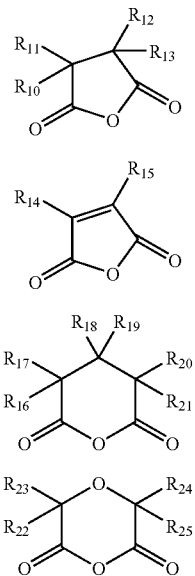

wherein, in Formulae 2 to 5, $R_{10}$ to $R_{25}$ are each independently hydrogen or a C1 to C10 alkyl; and a non-aqueous organic solvent, wherein:

the silylborate-based compound (A) and the anhydride component (B) are included at a weight ratio (A/B) of about 0.1 to 0.5 or 2 to about 15, the silylborate-based compound (A) is included in an amount of about 0.05 to about 3 wt % based on the combined weight of the non-aqueous organic solvent and the lithium salt, and the anhydride component (B) is included in an amount of about 0.3 to about 3 wt % based on the combined weight of the non-aqueous organic solvent and the lithium salt, wherein:

the organic solvent includes about 15 to about 25 volume % of a cyclic carbonate and the electrolyte has a viscosity of about 3.0 to about 3.7 cP at 0° C., or the organic solvent includes about 26 to about 35 volume % of a cyclic carbonate and the electrolyte has a viscosity of about 4.0 to about 4.7 cP at 0° C.

2. The electrolyte for a rechargeable lithium battery as claimed in claim 1, wherein the electrolyte has a viscosity of about 3.2 to about 3.5 cP at 0° C.

3. The electrolyte for a rechargeable lithium battery as claimed in claim 1, wherein the silylborate-based compound (A) is included in an amount of about 0.5 to about 2 wt % based on the combined weight of the non-aqueous organic solvent and the lithium salt.

4. The electrolyte for a rechargeable lithium battery as claimed in claim 1, wherein the anhydride component (B) is included in an amount of about 0.3 to about 2 wt % based on the combined weight of the non-aqueous organic solvent and the lithium salt.

5. The electrolyte for a rechargeable lithium battery as claimed in claim 1, wherein $R_1$ to $R_9$ are each independently a halogen-substituted C1 to C3 alkyl or an unsubstituted C1 to C3 alkyl.

6. The electrolyte for a rechargeable lithium battery as claimed in claim 1, wherein the anhydride component (B) includes at least one of succinic anhydride, methyl succinic anhydride, dimethyl succinic anhydride, maleic anhydride, glutaric anhydride, and diglycoric anhydride.

7. The electrolyte for a rechargeable lithium battery as claimed in claim 1, wherein the non-aqueous organic solvent includes a cyclic carbonate and a linear carbonate.

8. The electrolyte for a rechargeable lithium battery as claimed in claim 7, wherein the non-aqueous organic solvent further includes at least one of an ester-based solvent, an ether-based solvent, a ketone-based solvent, an alcohol-based solvent, and an aprotic solvent.

9. The electrolyte for a rechargeable lithium battery as claimed in claim 1, wherein the lithium salt includes at least one of $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $Li(CF_3SO_3)_2N$, $LiC_4F_9SO_3$, $LiClO_4$, $LiAlO_4$, $LiAlCl_4$, LiCl, LiI, and $LiB(C_2O_4)_2$.

10. The electrolyte for a rechargeable lithium battery as claimed in claim 1, wherein the electrolyte has a lithium salt concentration of about 0.1 M to about 1.4 M.

11. A rechargeable lithium battery, comprising:

a positive electrode;

a negative electrode; and an electrolyte including:

a lithium salt, a silylborate-based compound (A) represented by Formula 1:

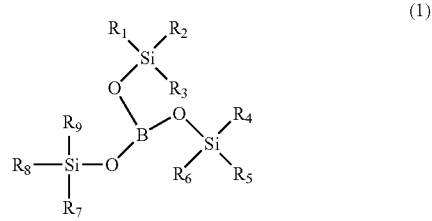

wherein, in Formula 1, $R_1$ to $R_9$ are each independently hydrogen, a halogen-substituted C1 to C10 alkyl, or an unsubstituted C1 to C10 alkyl, an anhydride component (B) consisting of one or more compounds represented by Formulae 2 to 5:

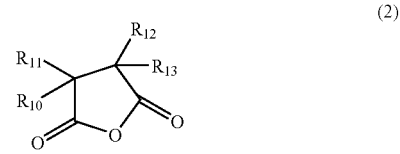

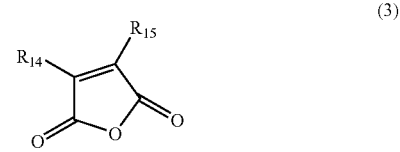

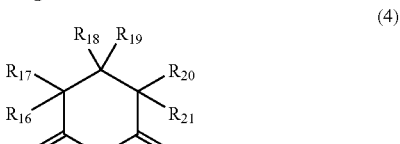

-continued

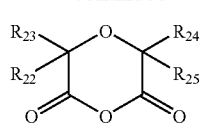

(5)

wherein, in Formulae 2 to 5, $R_{10}$ to $R_{25}$ are each independently hydrogen or a C1 to C10 alkyl, and a non-aqueous organic solvent, wherein:

the silylborate-based compound (A) and the anhydride component (B) are included at a weight ratio (A/B) of about 0.1 to 0.5 or 2 to about 15, the silylborate-based compound (A) is included in an amount of about 0.05 to about 3 wt % based on the combined weight of the non-aqueous organic solvent and the lithium salt, and the anhydride component (B) is included in an amount of about 0.3 to about 3 wt % based on the combined weight of the non-aqueous organic solvent and the lithium salt, wherein:

the organic solvent includes about 15 to about 25 volume % of a cyclic carbonate and the electrolyte has a viscosity of about 3.0 to about 3.7 cP at 0° C., or the organic solvent includes about 26 to about 35 volume % of a cyclic carbonate and the electrolyte has a viscosity of about 4.0 to about 4.7 cP at 0° C.

12. The rechargeable lithium battery as claimed in claim 11, wherein the electrolyte has a viscosity of about 3.2 to about 3.5 cP at 0° C.

13. The rechargeable lithium battery as claimed in claim 11, wherein the silylborate-based compound (A) is included in an amount of about 0.5 to about 2 wt % based on the combined weight of the non-aqueous organic solvent and the lithium salt.

14. The rechargeable lithium battery as claimed in claim 11, wherein the anhydride component (B) is included in an amount of about 0.3 to about 2 wt % based on the combined weight of the non-aqueous organic solvent and the lithium salt.

15. The rechargeable lithium battery as claimed in claim 11, wherein $R_1$ to $R_9$ are each independently a halogen-substituted C1 to C3 alkyl or an unsubstituted C1 to C3 alkyl.

16. The rechargeable lithium battery as claimed in claim 11, wherein the anhydride component (B) includes at least one of succinic anhydride, methyl succinic anhydride, dimethyl succinic anhydride, maleic anhydride, glutaric anhydride, and diglycoric anhydride.

17. The rechargeable lithium battery as claimed in claim 11, wherein the silylborate-based compound (A) and the anhydride component (B) are included at a weight ratio (A/B) of 2 to about 15.

* * * * *